T. J. STURTEVANT.
CRUSHING ROLL MACHINE.
APPLICATION FILED JUNE 30, 1919.
1,381,362.
Patented June 14, 1921.
2 SHEETS—SHEET 2.
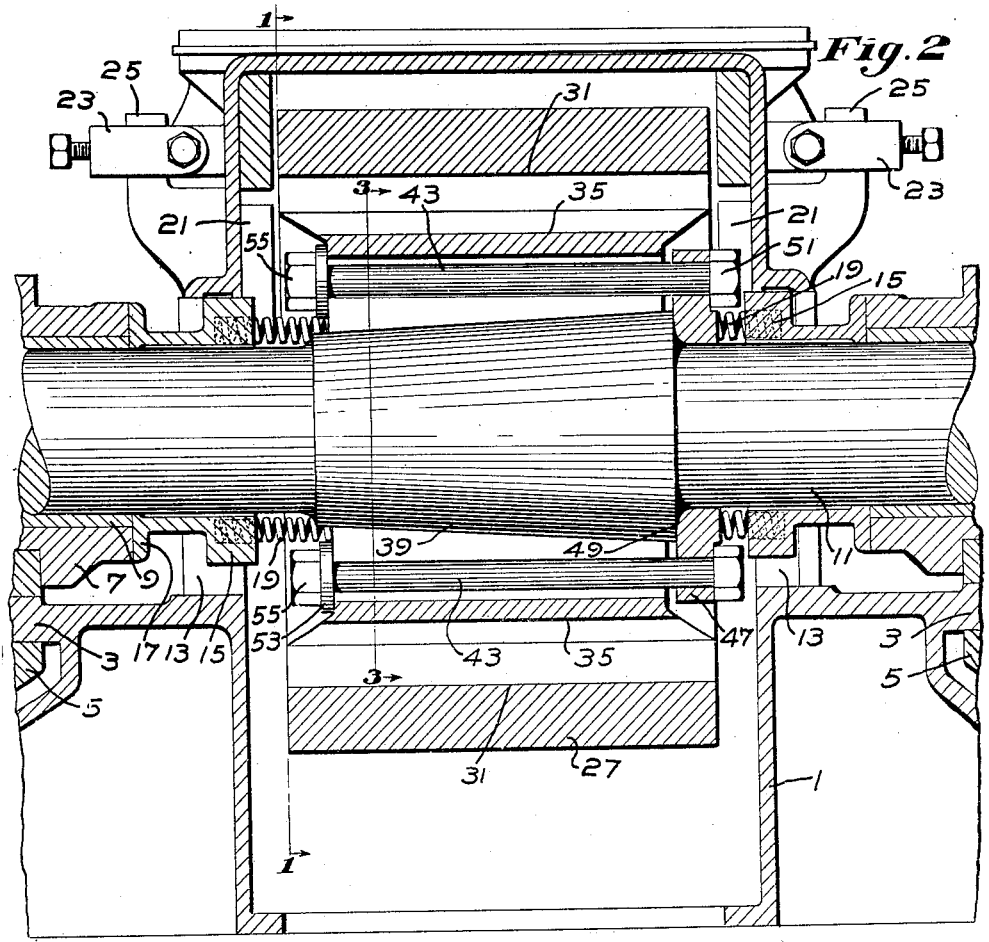
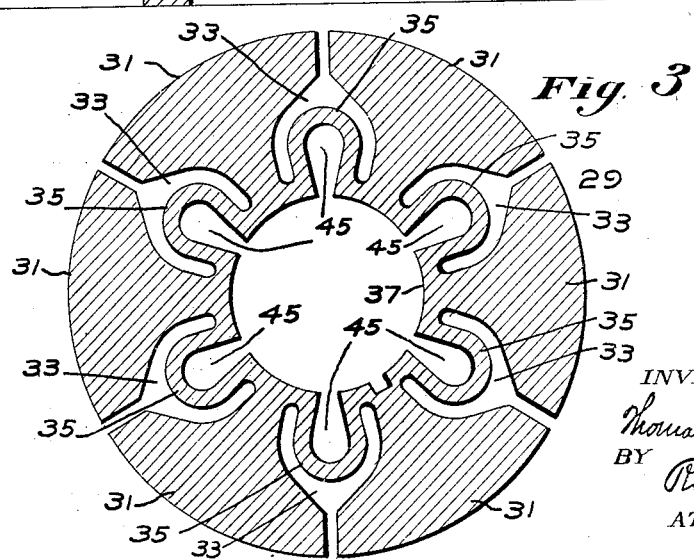
INVENTOR:
Thomas J. Sturtevant
BY
ATTORNEY

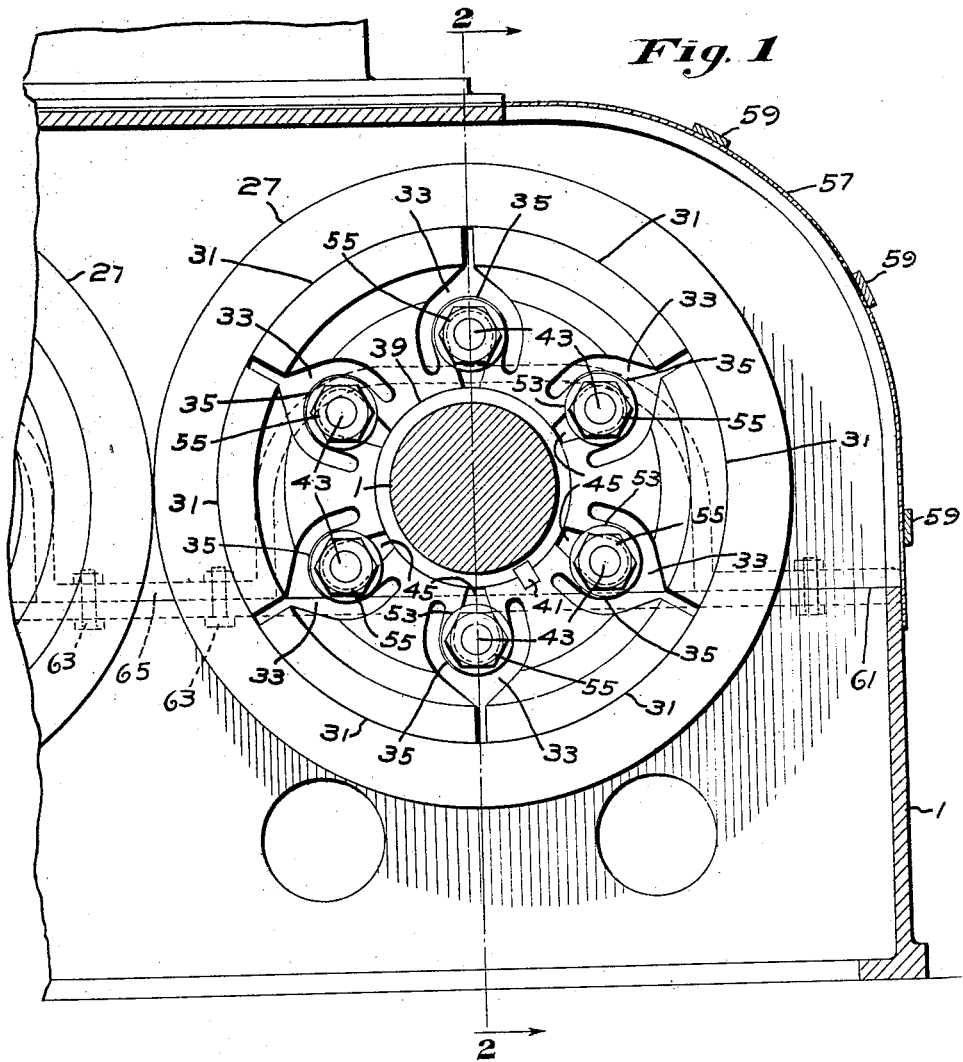

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

CRUSHING-ROLL MACHINE.

1,381,362.  Specification of Letters Patent.  Patented June 14, 1921.

Original application filed February 13, 1917, Serial No. 148,407. Divided and this application filed June 30, 1919. Serial No. 307,547.

*To all whom it may concern:*

Be it known that I, THOMAS J. STURTEVANT, a citizen of the United States, residing at Wellesley, county of Norfolk, and State of Massachusetts, have invented an Improvement in Crushing-Roll Machines, of which the following description, in connection with the accompanying drawings, is a specification, like characters on the drawings representing like parts.

The invention to be hereinafter described relates to devices for connecting annular members or other elements to shafts. In the present instance of the invention, the device is employed for connecting the crushing roll or rim to a shaft of a machine for crushing materials.

The present application is a division from my co-pending application, Serial No. 148,407, filed February 13, 1917, for an improvement in crushing roll machines.

These crushing roll machines are of heavy, powerful construction, and in crushing rocks and other materials, the rolls receive a pounding action which wears the bore of the roll or tire and tends to loosen the same from its shaft. One of the purposes of the invention, therefore, is to provide simple and effective means for securing the tire or roll to the shaft with provision for ready adjustment of the device to compensate for the wear on the bore of the tire or roll and thereby maintain the same securely on its shaft.

The heavy duty which these machines are called upon to perform reduces the outer active crushing surface of the tire or roll and renders it necessary from time to time to substitute new tires for worn ones. Another purpose of the invention, therefore, is to provide simple and efficient means whereby the worn tire or roll may be quickly and readily removed from the shaft and a new one substituted therefor and secured to the shaft.

With the aforesaid and other objects in view, the character of the invention may be best understood by reference to the following description of one good form thereof shown in the accompanying drawings, wherein:

Figure 1 is a vertical section through a portion of a crushing machine showing the device for securing the tire or roll to the shaft;

Fig. 2 is a vertical section taken on line 2—2 of Fig. 1; and

Fig. 3 is a vertical section through the expansion member taken on line 3—3 of Fig. 2.

Referring to the drawings, a portion of a crushing machine is shown therein comprising a casing 1 and tracks 3 at opposite sides thereof along which carriages 5 are adapted to be adjusted. Mounted on the carriages are bearing boxes 7 having bushings 9 in which a shaft 11 is journaled. This shaft projects through openings 13 in the side walls of the casing substantially larger than the diameter of said shaft. Mounted on the shaft within the openings 13 are collars 15 having flanges 17 pressed against the ends of the bearing boxes 7 by coil springs 19. Shield plates 21 are adapted to engage opposed faces of the crusher roll to be described, and are carried by doors which may be hinged to the casing and secured in closed position by bail latches 23 engaging upstanding fingers 25 projecting from the side walls of the casing.

The construction thus far described is the same as that shown and described in my said copending application, and therefore, further elucidation thereof herein is unnecessary.

In the present instance of the invention, the securing device is used to connect the tire or roll 27 to the shaft 11. This device, in the present embodiment of the invention, comprises an expansion member 29 having a plurality of peripheral segments 31 with recesses 33 between them. Suitable means may be provided to connect the peripheral segments and allow relative movement thereof to admit expansion and contraction thereof. This means, in the present instance of the invention, comprises arcuate expansible webs 35 occupying the recesses 33 and preferably formed integral with the peripheral segments, the construction being such that said webs may readily bend to allow movement of the peripheral segments radially outward or inward. The expansion member may have a tapered bore 37 adapted to fit on a tapered enlargement 39 of the shaft 11. To prevent rotation of the expansion member relatively to the shaft, a key 41 (Fig. 1) may be inserted in registering grooves in the expansion member and shaft.

Suitable means may be provided for expanding the member 29 into tight frictional engagement with the shaft and the bore of the tire or roll 27. This means, in the present instance of the invention, comprises through bolts 43 which may be entered through holes 45 afforded by the arcuate webs 35. These bolts may also project through openings in a collar 47 mounted on the shaft 11 and adapted to engage a shoulder 49 at the end of the tapered portion of the shaft having the larger diameter. The heads 51 of the through bolts 43 may engage the outer face of said collar, and washers 53 may be pressed against the opposite face of the expansion member by nuts 55 of the bolts.

When it is desired to secure the rim or tire to the shaft, the expansion member is slid onto the conical portion of the shaft and into the rim or tire. Next the through bolts are inserted through the collar 47 and the holes 45 of the expansion member, and the nuts 55 are tightened. Since the collar is confined against movement axially of the shaft toward the left of Fig. 2, tightening of the bolts will adjust the expansion member toward the right of Fig. 2, thereby moving the expansion member toward the end of the tapered portion 39 of the shaft of larger diameter. This will cause the peripheral segments to be forced radially outward into tight frictional engagement with the bore of the tire or roll.

The heavy pressure and shocks and jolts on the roll in the work of reducing materials, tend to wear the engaging surfaces of the expansion member and the tire or roll and result in loosening of the tire or roll on the expansion member. The latter may be readily adjusted to compensate therefor simply by tightening the nuts 55.

If it is desired to remove the tire or roll for any purpose, or to substitute a new one therefor, the bolts are released and removed, the collar 47 is transferred from the larger to the smaller end of the conical portion 39 of the shaft, and the bolts are reinserted, but with their heads reversed, so that they engage the outer face of the collar in its new position. Then the nuts are tightened, thereby forcing the expansion member toward the reduced end of the conical portion 39 of the shaft. As a result the expansion member may be freed from the tire or roll and admit ready removal of the latter from the shaft.

In thus removing the tire or roll, the expansion member is released by imparting a steady drawing movement thereto axially of the shaft with mechanical advantage and without the necessity of pounding of the parts and attendant likelihood of mutilation thereof. The expansion member is symmetrically constructed so that the peripheral segments thereof may expand equally in all directions, and the expansion webs connecting the segments are so formed and located that they may readily flex to permit expansion and contraction movements of the segments without breaking or weakening said webs.

The casing may be provided with a curtain 57 stiffened by battens 59 and attached at its upper end to the casing. This curtain may readily be lifted when desired to permit inspection of and access to the parts in the casing. The casing may be divided on the horizontal line 61 and the upper and lower parts thereof may be detachably connected by bolts 63 entered through flanges 65 projecting outward from said parts at the juncture thereof. The construction is such that the upper part may be removed from the lower part to allow removal of the shaft and roll or tire from the casing.

It will be understood that the invention is not limited to the specific embodiment shown, and that various deviations may be made therefrom without departing from the spirit and scope of the appended claims.

What is claimed is:—
1. The combination of a shaft, an annular member, an expansible member interposed between said shaft and annular member and comprising sections having spaces between them, and reversely bent flexible webs connecting said sections to allow expansion of said sections into secure gripping relation with said shaft and annular member.

2. The combination of a shaft, an annular member, an expansible member between said shaft and annular member and comprising a plurality of sections having radial slots between said sections, and curved flexible webs within said radial slots for connecting said sections and bridging the spaces between them, and means coöperating with said expansible member to expand it to secure the annular member to the shaft.

3. The combination of a shaft, an annular member having a bore larger than the diameter of said shaft, an annular expansible member between said shaft and annular member comprising sections having spaces between them, and flexible webs within said spaces for connecting said sections and bridging said spaces, and securing elements extending through said spaces for relatively adjusting the parts to cause the expansible member to secure the annular member to said shaft, said flexible webs being formed to receive said securing elements.

4. The combination of inner and outer members, the latter encircling the former, an expansible member interposed between said inner and outer members and comprising sections having spaces between them, and curved, flexible webs within said spaces for connecting said sections, and means coöperating with said expansible member relatively to adjust said sections and flex the curved webs to secure the outer member on the inner member.

5. The combination of outer and inner members, the latter being larger than the former and surrounding the same, an expansion member comprising a plurality of sections located between the outer and inner members, said expansion member having recesses therein located intermediate the outer and inner members, and reversely bent flexible webs occupying said recesses and connecting said sections, that the latter may be relatively adjusted to secure the outer member to the inner member.

6. The combination of outer and inner members, the latter encircling the former, an annular expansion member between the outer and inner members and comprising a plurality of sections having spaces between them, and curved flexible webs within said spaces for connecting said sections, said expansible member having a circumferential portion tapered for coöperation with one of the outer and inner members, and means to adjust the expansible member in the direction of its axis longitudinally and relatively with respect to one of the outer and inner members to cause the expansible member to secure the outer and inner members together.

7. The combination of a shaft, an annular member encircling said shaft, an expansible member between the shaft and annular member comprising sections and reversely bent flexible webs connecting said sections, said expansion member and shaft having tapered portions, a ring on said shaft, and bolts entered through said expansion member and coöperating with said ring to adjust the expansion member relatively to the shaft to flex the webs and expand the sections into gripping relation with the shaft and annular member.

8. The combination of outer and inner members, an expansion member between the outer and inner members comprising spaced sections and reversely bent webs connecting said sections, said expansion member and one of the outer and inner members having interengaging tapered portions, a collar on said shaft, bolts entered through said expansion member and collar, said collar and bolts when in one position being adapted to adjust the expansion member to secure the outer and inner members against relative movement, and said collar and bolts being reversible to release the expansion member from the outer and inner members.

9. The combination of a shaft, an annular member, an annular expansible member between the shaft and annular member and comprising a plurality of sections having spaces between the sections, flexible members formed integral with the sections and located within said spaces to form compressible connections between the adjacent sections, and means coöperating with the annular expansible member to expand it into gripping engagement with the shaft and annular member.

In testimony whereof, I have signed my name to this specification.

THOMAS J. STURTEVANT.